UNITED STATES PATENT OFFICE.

HENRY R. RANDALL, OF BROOKLYN, NEW YORK.

IMPROVEMENT IN PROCESSES OF MANUFACTURING MALT EXTRACT.

Specification forming part of Letters Patent No. 187,313, dated February 13, 1877; application filed January 24, 1877.

*To all whom it may concern:*

Be it known that I, HENRY R. RANDALL, of the city of Brooklyn, in the county of Kings and State of New York, have invented an Improvement in the Manufacture of Malt Extract, of which the following is a specification:

Ordinarily, in the manufacture of malt extract for brewing purposes, from ground corn, grain, or other suitable starch-bearing substance, the malt has been mingled with the starch-bearing substance at the outset of the operation. If this is done at that temperature at which the action of malt upon starch is most effective, the starch is not wholly liberated from the starch-bearing material, and consequently the yield of extract is deficient. If, on the other hand, the temperature is raised sufficiently high to insure the elimination of all the starch, the malt is itself injured; failing to act to the best advantage upon the starch, in like manner it diminishes the product of extract.

The object of this invention is to avoid the drawbacks just indicated, and to insure the elimination from the starch-bearing material of practically the entire quantity of starch contained therein, and then to insure the full effect upon such eliminated starch of all the malt brought in contact therewith, thereby insuring an increased yield of starch from the starch-bearing material, and the subsequent conversion of this eliminated starch into malt extract by the most advantageous action of the malt.

To this end, the invention consists in a novel process for the manufacture of malt extract, the same comprising the two successive steps, firstly, of washing, at a temperature of about 180°, the ground corn or other grain or starch-bearing material in a raw or unmalted condition separate and apart from the use of malt, and, secondly, mingling with the thus-treated starch-bearing material at a temperature of about 158° to 160° an appropriate quantity of malt, so that the starch, being by the first step aforesaid completely eliminated from the refuse of the starch-bearing material, is exposed to the full action of the malt, thereby insuring the complete conversion of this starch into malt extract.

In the practice of my invention, I take the corn, or other grain or starch-bearing material, together with the hulls, and grind or comminute the same by any suitable means to a degree of fineness more or less approximating that of ordinary corn-meal, preferably somewhat finer than the latter. This I place in an ordinary mash-tub, or other suitable receptacle, and subject to a mashing operation at the temperature of 180° Fahrenheit, the object being to use that degree of warmth which will most rapidly cause the elimination of the starch from the refuse of the starch-bearing material during the operation aforesaid. It is to be understood that this ground corn, or other grain or starch-bearing material, is placed in the mash-tub, or equivalent receptacle, in a raw or unmalted condition, and that this first step in the process differs from the ordinary mashing process in this, that during such first step no malt whatever is mingled with the starch-bearing material, the object being simply to fully eliminate the starch from such material. This first-step completed, malt is then added in suitable quantities, and, inasmuch as the starch has been practically wholly eliminated from the other portions or refuse of the starch-bearing material, it is exposed to the full action of the malt, and the operation may be conducted at that comparatively moderate temperature at which the most effective action of the malt is secured, and such temperature I find most efficient when at about 158° to 160°, and such should be the temperature employed. By these two successive steps, therefore, I first secure the total elimination of the starch from the starch-bearing material, and then secure practically the absolutely most advantageous action of the malt upon the starch, and thus, by securing the greatest possible amount of starch and the most efficient action of the malt thereon, I produce a maximum quantity of extract from any given quantity of grain or starch-bearing material, thereby producing a decided and valuable improvement in the manufacture of beer, ale, or porter; in other words, of those liquors commonly termed malt liquors.

What I claim as my invention is—

The herein-described process of manufacturing malt extract from raw or unmalted grain or starch-bearing material for brewers' use, the same comprising the two successive steps of first eliminating the starch from the starch-bearing material by subjecting ground grain to the mashing process at a high temperature, about 180° Fahrenheit, and of subsequently subjecting such eliminated starch to the action of malt at a lower temperature, of about 160°, substantially as described.

HENRY R. RANDALL.

Witnesses:
EDWARD HOLLY,
H. WELLS, JR.